(12) United States Patent
Cornwell et al.

(10) Patent No.: US 7,465,532 B2
(45) Date of Patent: *Dec. 16, 2008

(54) IMAGE TRANSFER PROCESS FOR THIN FILM COMPONENT DEFINITION

(75) Inventors: Dwight Cornwell, Salinas, CA (US); Douglas Johnson Werner, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/870,364

(22) Filed: Oct. 10, 2007

(65) Prior Publication Data

US 2008/0026325 A1 Jan. 31, 2008

Related U.S. Application Data

(63) Continuation of application No. 10/751,807, filed on Jan. 5, 2004, now Pat. No. 7,297,470.

(51) Int. Cl.
*G03F 7/20* (2006.01)
*G11B 5/127* (2006.01)

(52) U.S. Cl. .................... 430/314; 430/320; 430/330

(58) Field of Classification Search .................. None
See application file for complete search history.

(56) References Cited

U.S. PATENT DOCUMENTS 7,297,470 B2 * 11/2007 Cornwell et al. ............ 430/315
2005/0147924 A1 * 7/2005 Cornwell et al. ............ 430/320

FOREIGN PATENT DOCUMENTS

JP 2001-344711 A * 12/2001

* cited by examiner

*Primary Examiner*—John A. McPherson
(74) *Attorney, Agent, or Firm*—Zilka-Kotab, PC

(57) ABSTRACT

A method for fabricating a thin film component according to one embodiment comprises forming a wafer having a thin film layer, a release layer, and a patterned layer of photoresist; transferring the pattern of the layer of photoresist to the release layer and the thin film layer; adding a layer of metal to the wafer; heating the wafer to a predetermined temperature for a period of time sufficient to cause deformation of the photoresist to an extent that the photoresist creates cracks in the metal layer; applying a solvent to dissolve at least a portion of the release layer, the solvent penetrating the cracks in the metal layer to reach the release layer; and removing the release layer and any portions of the layers above the release layer.

19 Claims, 5 Drawing Sheets

IMAGE TRANSFER PROCESS FOR THIN FILM COMPONENT DEFINITION

RELATED APPLICATIONS

This application is a continuation of U.S. patent application Ser. No. 10/751,807 filed Jan. 5, 2004, now U.S. Pat. No. 7,297,470.

FIELD OF THE INVENTION

The present invention relates to thin film device fabrication, and more particularly, this invention relates to an image transfer process for defining a width of a thin film layer or layers.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field).

One well known way to increase the performance of magnetic disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

Thin film head components such as sensors are created by wafer processing. Typically, a layer of photoresist is added to define the width of the component positioned underneath, and exposed material is removed by various processes. As components become smaller the lithographic patterns must also become smaller yet must maintain a high resolution to properly form the components.

Shrinking thin-film head (TFH) device geometries force adoption of more advanced lithography platforms for enhanced resolution of small features. Products planned for the near-term future exceed the printing capability of the existing manufacturing platform, deep-ultraviolet (DUV, 248 nm wavelength) lithography. The 193 nm wavelength lithography platform provides extended resolving capability, but poses challenges in integration of the lithographic patterns into the TFH read-head build process.

One difficulty is that 193 nm photoresists tend to have poor etch resistance. If reactive ion etching (RIE) is used, the topography of the photoresist pattern tends to be destroyed because the photoresist etches away along with the underlayer. If edges of the photoresist are reduced, i.e., the resolution is degraded, the edges of the component will be removed, resulting in a deformed component. Further, if too little photoresist remains, the photoresist will tend to become encapsulated by subsequently deposited materials, making liftoff difficult or impossible. FIG. 1 illustrates a read head 100 just before liftoff according to a standard photolithography process. As shown, the photoresist 102 becomes shrunken and rounded from the RIE, resulting in the deposited material 104 encasing the remaining resist structure completely. The solvent cannot reach the photoresist 102 to effect the liftoff.

Prior art attempts to overcome the problem of photoresist erosion used thicker layers of photoresist. However, the photoresist tended to fall over during subsequent processing. For typical photoresists, only an aspect ratio of about 3 to 1 photoresist height/width or less is stable enough for further processing.

Yet another problem is the need for a bottom antireflective coating (BARC) to suppress standing waves and sensitivity of the photoresist's printed linewidth to fluctuations in photoresist thickness. Most BARC materials are insoluble in wet stripping reagents, complicating rework of the photoresist pattern.

Electron-beam (e-beam) lithography provides an alternative platform for extended resolving capability, but it lags behind the optical platforms in readiness and is generally less cost-effective due to low tool throughput.

SUMMARY OF THE INVENTION

A method for fabricating a thin film component according to one embodiment comprises forming a wafer having a thin film layer, a release layer, and a patterned layer of photoresist; transferring the pattern of the layer of photoresist to the release layer and the thin film layer; adding a layer of metal to the wafer; heating the wafer to a predetermined temperature for a period of time sufficient to cause deformation of the photoresist to an extent that the photoresist creates cracks in the metal layer; applying a solvent to dissolve at least a portion of the release layer, the solvent penetrating the cracks in the metal layer to reach the release layer; and removing the release layer and any portions of the layers above the release layer.

A method for fabricating a magnetic head according to another embodiment comprises forming a wafer having a sensor film; adding a release layer to the wafer above the sensor, the release layer being soluble in a solvent; forming a layer of photoresist above the release layer; processing the layer of photoresist to define a pattern, the patterned layer of photoresist defining a track width of the sensor film under covered regions of the layers, the covered regions being under the patterned layer of photoresist; substantially removing uncovered regions of the release layer; substantially removing uncovered regions of the sensor film; adding a layer of metal to the wafer; baking the wafer at a predetermined temperature for a period of time sufficient to cause deformation of the photoresist to an extent that the photoresist creates cracks in the metal layer; applying a solvent to the wafer to dissolve at least a portion of the release layer, the solvent penetrating the cracks in the metal layer to reach the release layer; and removing portions of the layers above the release layer.

A method for fabricating a thin film component according to another embodiment comprises forming a wafer having a thin film layer, a release layer, a patterned layer of photoresist, and a layer of metal covering the photoresist; heating the wafer to a predetermined temperature for a period of time sufficient to cause deformation of the photoresist to an extent that the photoresist creates cracks in the metal layer; applying a solvent to dissolve at least a portion of the release layer, the solvent penetrating the cracks in the metal layer to reach the release layer; and removing the release layer and at least portions of the layers above the release layer.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides new, unique processes for defining and dimensioning thin film components. For clarity, much of the description shall be described in terms of defining a width of a magnetic sensor, one skilled in the art understanding that this process can be adapted to fabrication of many other types of electronic components.

Figure 1:
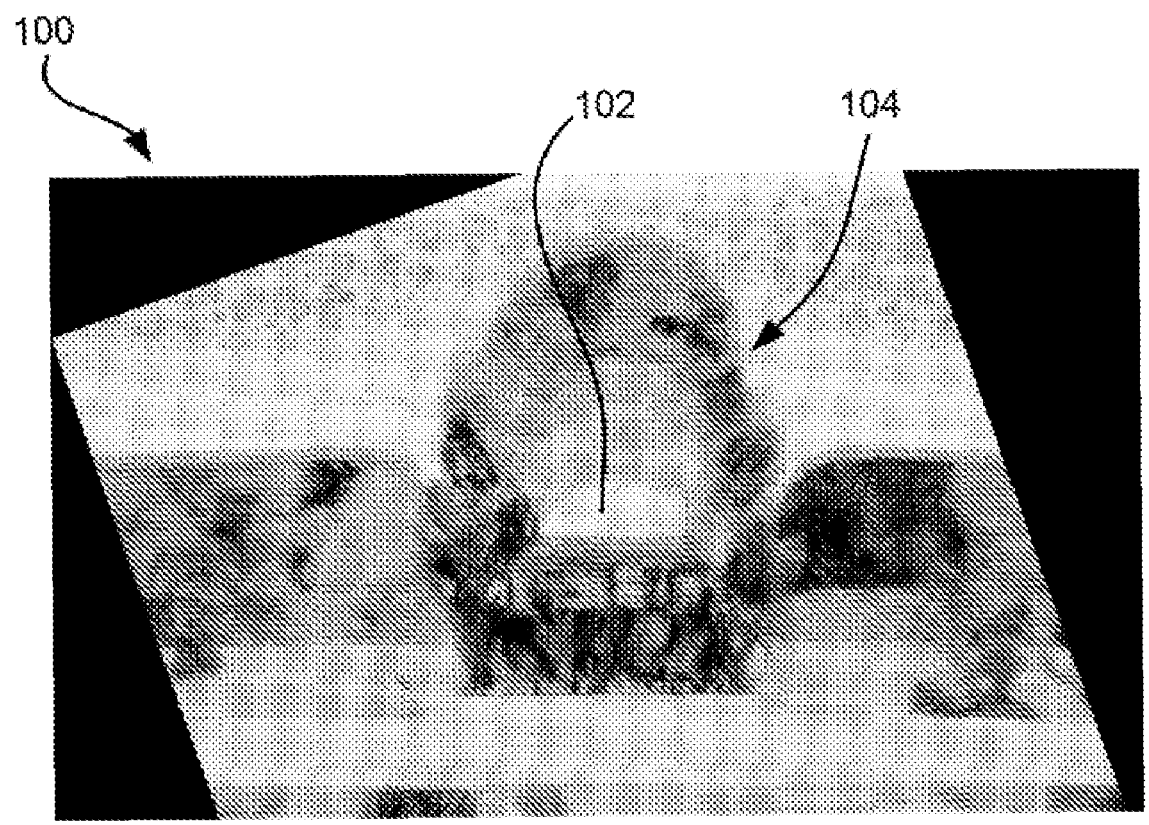
FIG. 1 is a cross sectional view of a read head during fabrication.
Figure 2:
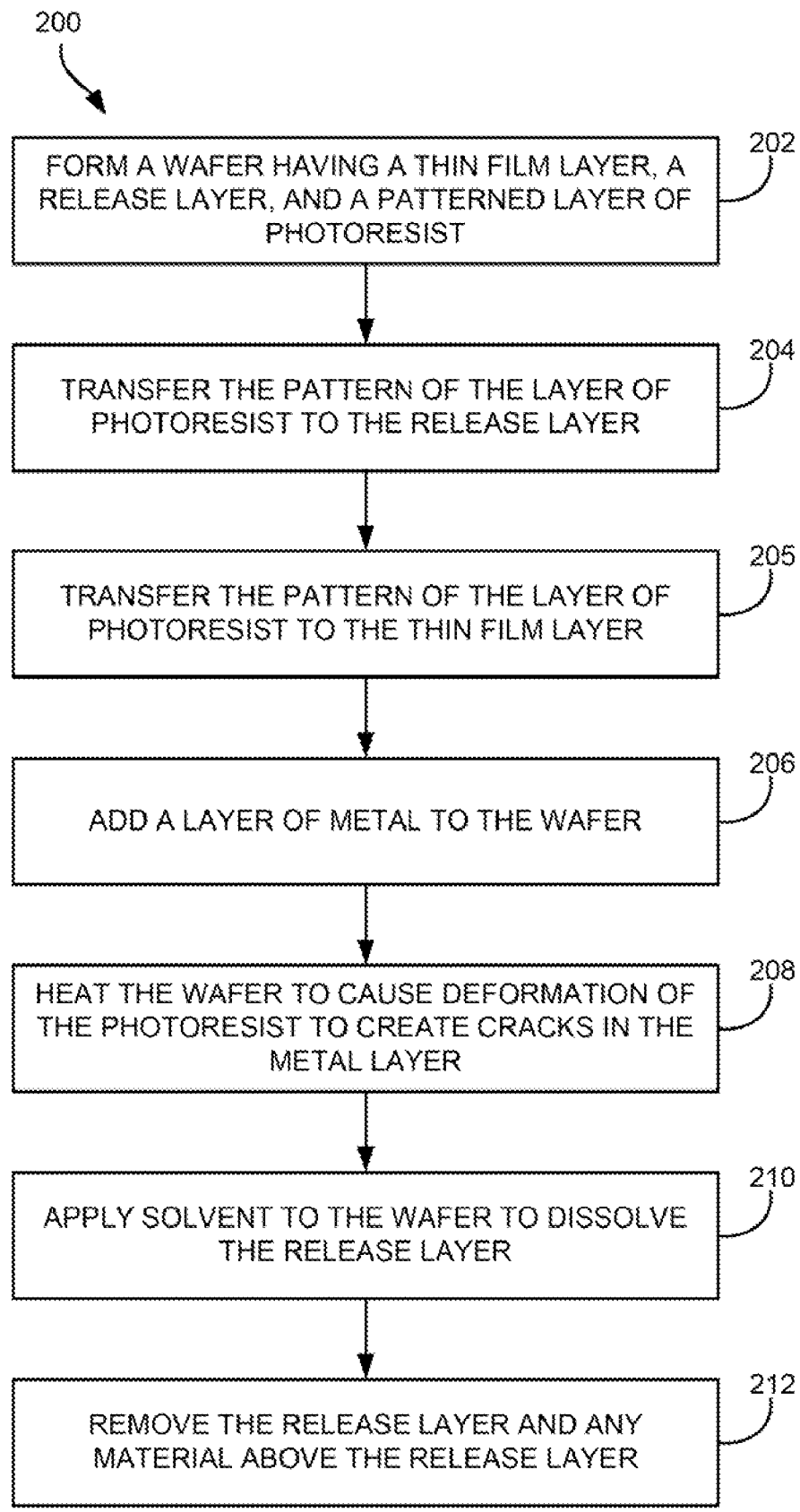
FIG. 2 is a flow chart of a process for fabricating a thin film component.

FIG. 2 illustrates the general process flow of a method 200 for fabricating a thin film component. In step 202, a wafer having a thin film layer, a release layer, and a patterned layer of photoresist is formed. In step 204, the pattern of the layer of photoresist is transferred to the release layer. In step 205, the wafer is subjected to ion milling to remove exposed portions of the thin film layer. A layer of metal is added to the wafer in step 206. In step 208, the wafer is heated to a temperature above a glass transition temperature of the photoresist for a period of time sufficient to cause deformation of the photoresist to an extent that the photoresist creates cracks in the overlying metal layer. In step 210, a solvent is applied to the wafer to dissolve the release layer, the solvent penetrating the cracks in the metal layer to reach the release layer. The release layer and any material above the release layer are removed in step 212.

Following is a description of a preferred combination of process flow and material set which uniquely and satisfactorily addresses each of the preferred elements of a process for defining a read track width for a magnetic sensor:

Good adhesion of photoresist stencil materials to substrate;
Linewidth imaging capability down to 60 nm or smaller;
Suppression of thin-film interference effects on the photoresist size & profile;
Ability of the photoresist pattern to withstand downstream etching processes;
Reworkability of the photoresist stencil.

The process flow is as follows.

Figure 3A:
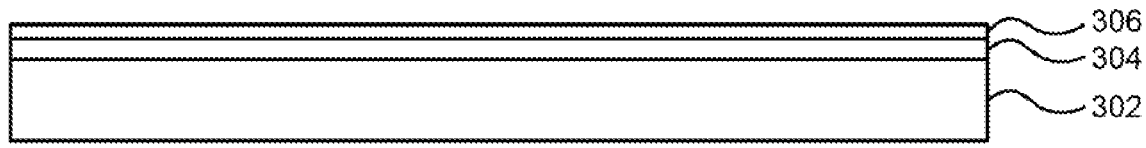
FIGS. 3A-3H are partial cross-sectional views of a wafer being processed according to a preferred method.

Step 1:

As shown in FIG. 3A, a wafer substrate including a gap layer 302 and a magnetic sensor film 304 is formed. The magnetic sensor film 304 (which can be magnetoresistive (MR), giant-magnetoresistive (GMR), magnetic tunnel-junction (MTJ), or other) is coated with a carbon film 306 of sufficient thickness and toughness to act as an etch-stop layer 306 in subsequent chemical-mechanical polishing (CMP) step 9.

Figure 3B:
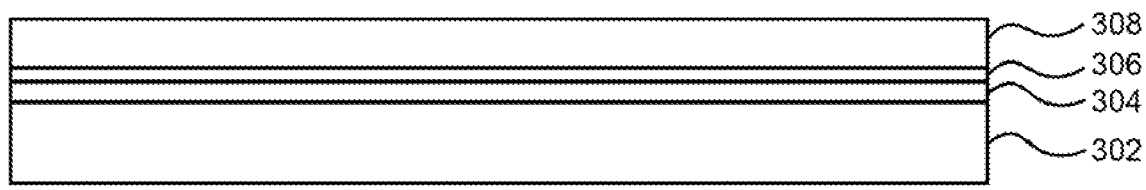

Step 2:

The substrate is coated with a non-photoactive "underlayer" or "release layer" material 308, as depicted in FIG. 3B. The release layer 308 is a multifunctional layer, and also functions as a sacrificial layer. The release layer 308 is preferably formed of a material having some, and ideally, all, of the following properties:

Good adhesion to the underlying carbon so that the resist subsequently added will adhere to he substrate.
Good resistance to downstream etching.
Good absorption of 193 nm light to provide BARC functionality. Good antireflective qualities are desirable at these wavelengths of exposure because of the generation of standing waves, and because the process is very sensitive to minor fluctuations in resist thickness.
Solvent strippability to simplify rework processing and to facilitate the downstream liftoff step. This is not a characteristic shared by typical BARC layers, which normally require RIE to remove. Preferably, the material is soluble in conventional liftoff solvents such as NMP. If the photo mask needs to be reworked because of misalignment, etc., the underlayer can be easily removed by applying solvent. In contrast, if dry etchable BARCs were used, a dry etching process would have to be performed, and since this layer is formed on a carbon surface, some carbon would also be removed. Thus, additional processing to replenish the carbon layer would have to be performed.

Resistance to intermixing with the overlying photoresist image layer.

One material which has all of these properties is a polyimide manufactured by Arch Chemicals, Inc. 501 Merritt 7, Norwalk, Conn. 06856 under the trade name Durimide. The coated thickness is determined by the extent of downstream etching, but may be in the range of about 20-400 nm. The methodology disclosed herein provides a new use for this preferred material, which is generally sold in a form about 10× thicker (3-6 microns) than is used in this illustrative process, and is typically used in fully cured form as a lasting part of the device structure rather than as a sacrificial layer as here.

The material is baked at a temperature and time sufficient to drive off casting solvents and prevent intermixing, but insufficient to cure the polyimide (which would render it insoluble in liftoff and rework solvents). In the illustrative process, the Durimide is baked at 200° C. for two minutes.

Figure 3C:
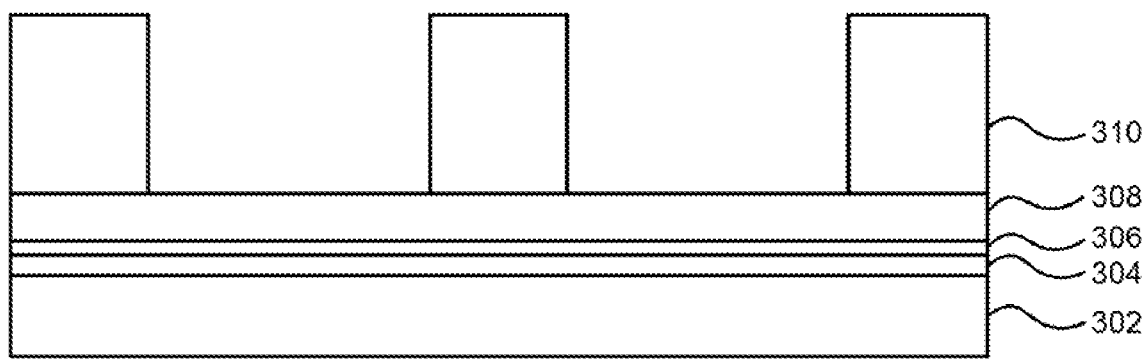

Step 3:

Referring to FIG. 3C, the substrate is coated with a photoresist "image layer" material 310 which is preferably capable of resolving lines down to 60 nm width and smaller, at a thickness and etch resistance sufficient to withstand downstream etching steps 4 and 5 such that not all of the material is removed. Since photoresist lines tend to collapse at a height/width aspect ratio greater than 4 or 5, it is preferred that the material's resistance to downstream etching be sufficient to allow its thickness to be about 250 nm or less before the etching, yet maintain a thickness of at least 100 nm after etching so that the reflow bake step 7 can be effective. A suitable photoresist material is TIS 51-23, also available from Arch Chemicals, Inc. TIS 51-23 combines excellent imaging characteristics with good resistance to RIE etching in an $O_2$ environment, conferred by incorporation of silicon (Si) into the polymer structure. Si-containing resists have been found to improve the resistance of the imaging layer to reactive ion etching (RIE). It is believed that the Si reacts with the oxygen and forms a glass that reduces damage to the imaging layer by the RIE.

A stencil of the read-head track image is formed in the image layer photoresist 310, using 193 nm light through a suitable mask in a step and scan printer, followed by post-exposure bake and develop steps under conditions suitable for the particular imaging resist being used.

Figure 3D:
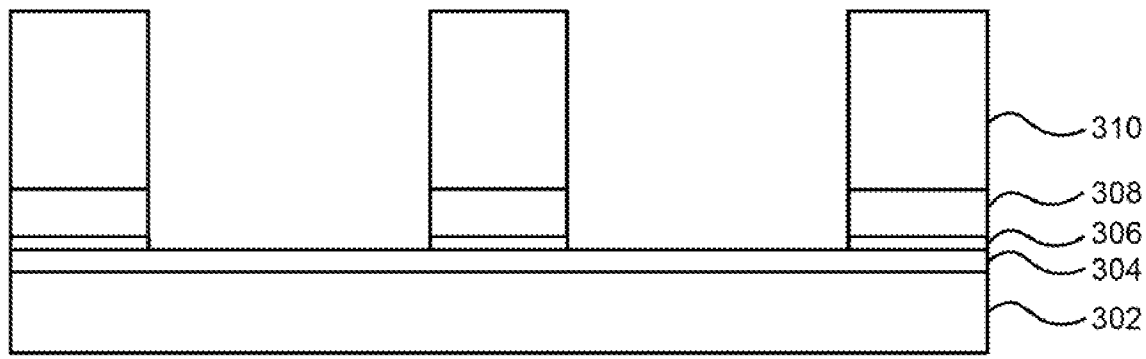

Step 4:

As shown in FIG. 3D, the wafer is subjected to RIE in an $O_2$ environment to remove the release layer and carbon etch-stop layer in the areas exposed in step 3. Again, the release layer 308 is preferably fairly resistant to the RIE due to the Si content. Experimentation with the preferred materials listed herein have shown about a 6 to 1 ratio of etch rate between the carbon layer 306 and the release layer 308.

Figure 3E:
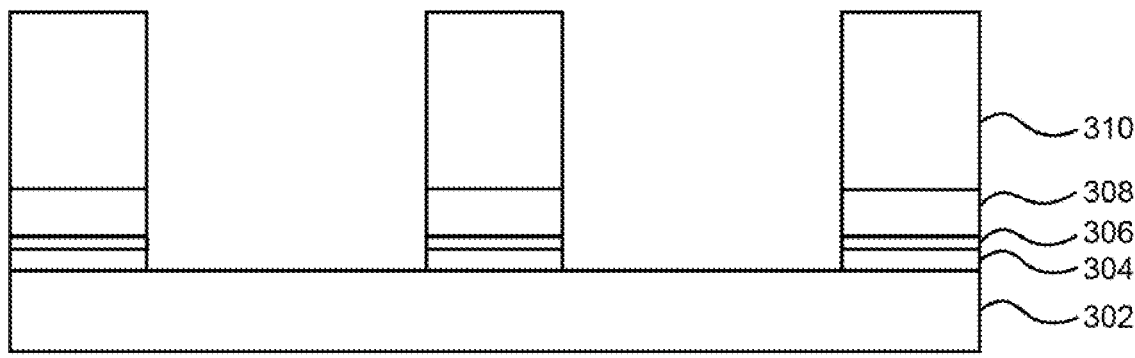

Step 5:

Referring to FIG. 3E, the wafer is subjected to ion milling to remove the magnetic sensor film 304 in the areas exposed in step 3. At this point, it is preferred that some image layer photoresist material 310 be left atop the release layer 308 in order for the downstream step 7 to work effectively.

Figure 3F:
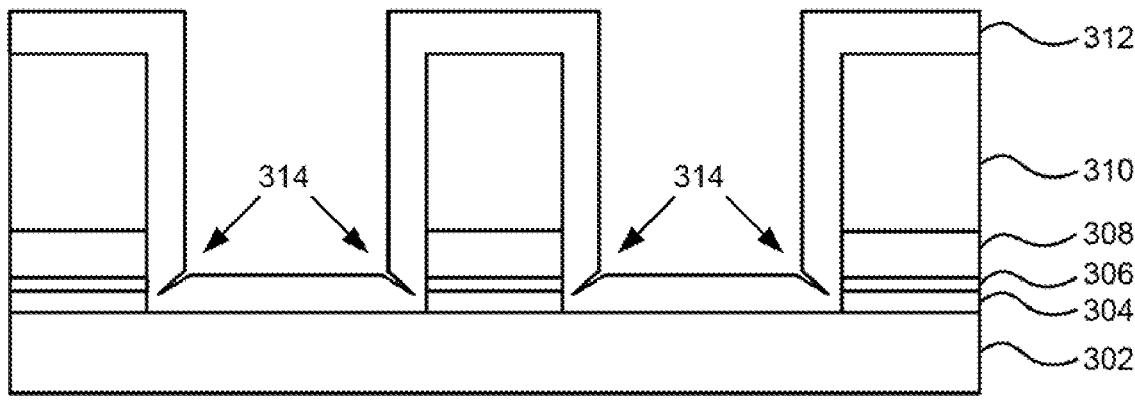

Step 6:

As depicted in FIG. 3F, metal 312 is added to the wafer to form biasing magnets and electrical connections to the sensor which is protected by the photoresist stencil 310 unexposed in step 3. Any suitable process to add the metal 312 may be used, such as ion beam deposition (IBD). At this point, enough of the imaging photoresist layer 310 is typically left that it is able to support the deposited material 312 without falling over. In the lower corners 314 of the structure, the thickness of the deposited metal 312 tends to be thinner, the importance of which will become apparent during discussion of the next processing step.

Figure 3G:
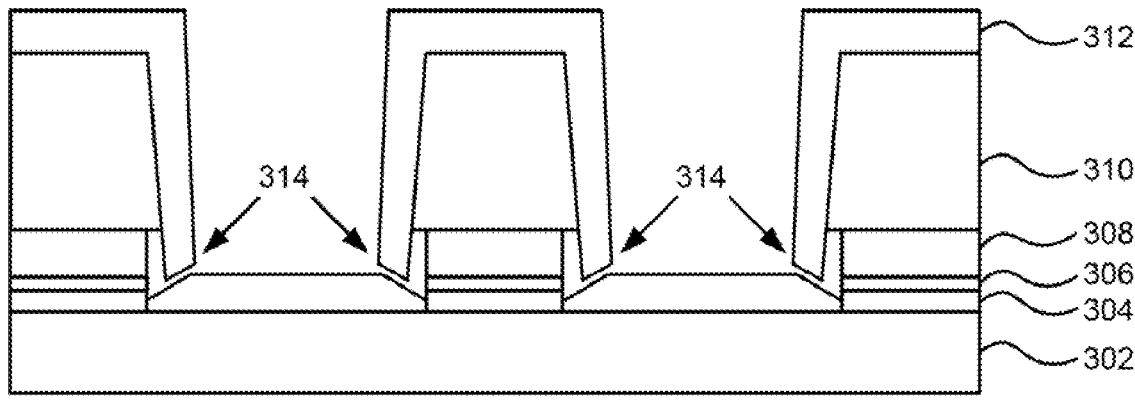

Step 7:

The wafer is baked at a temperature above the glass transition (Tg) of the image layer photoresist 310 for a time sufficient to cause it to flow. A temperature of about 150° C. is preferred for the materials listed herein. The resist flow causes the deposited metal layer 312 to crack and form pathways for solvent to penetrate to the release layer 308 in the subsequent step 8. In this exemplary method, as shown in FIG. 3G, the photoresist 310 swells and breaks the weak points (corners 314 and possibly other areas) of the deposited metal 312, creating cracks at the corners 314 (exaggerated in the FIG.) that allow the solvent to penetrate to the underlying release layer 308.

Figure 3H:
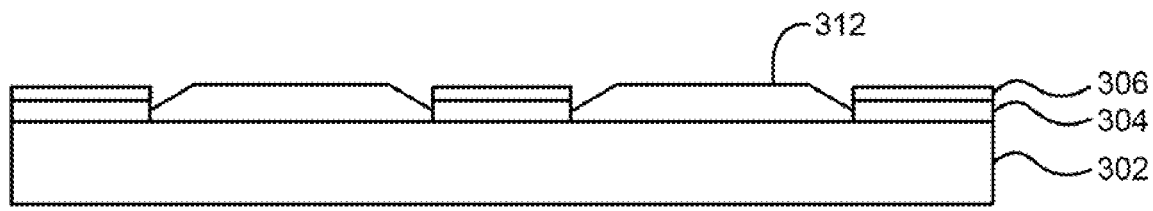

Step 8:

The wafer is exposed to a solvent such as NMP or other solvent capable of dissolving or weakening the release layer 308 to dissolve the release layer 308, and allow lifting off of the photoresist 310 and metal 312 atop it. Upon liftoff, the deposited metal layer 312 is then generally left only in the areas originally exposed during lithographic patterning in step 3, as shown in FIG. 3H.

Step 9:

An optional CMP process can be used to remove residues of metal and photoresist that may be left behind after the liftoff step 8. Formation and transfer of the read head track is now complete. The remainder of the head can then be formed.

Figure 4:
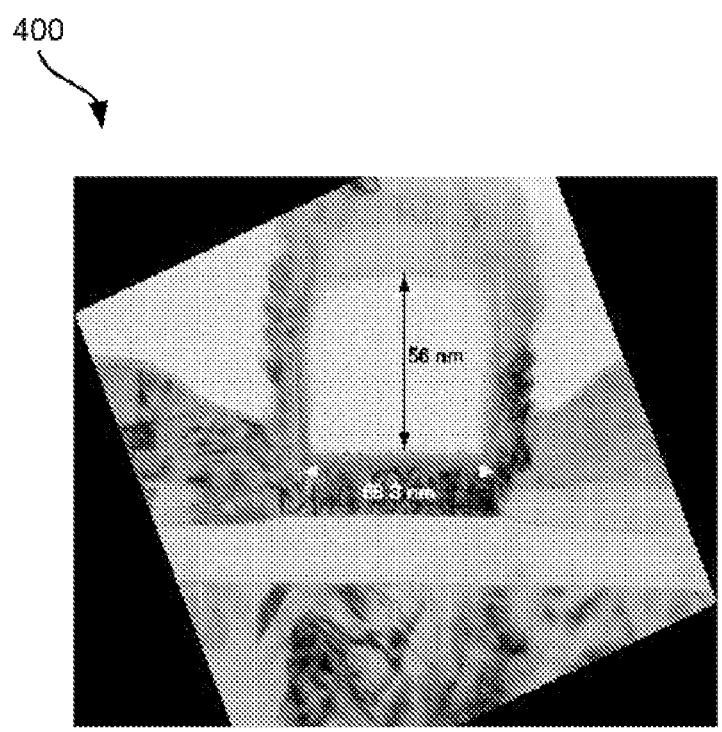
FIG. 4 is a cross sectional view of a read head during fabrication according to a preferred method.

FIG. 4 illustrates a read head 400 formed by the process above just before the baking of step 7. As shown, the track width is very well defined.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for fabricating a thin film component, comprising:

forming a wafer having a thin film layer, a release layer, and a patterned layer of photoresist;

transferring the pattern of the layer of photoresist to the release layer and the thin film layer;

adding a layer of metal to the wafer;

heating the wafer to a predetermined temperature for a period of time sufficient to cause deformation of the photoresist to an extent that the photoresist creates cracks in the metal layer;

applying a solvent to dissolve at least a portion of the release layer, the solvent penetrating the cracks in the metal layer to reach the release layer; and removing the release layer and any portions of the layers above the release layer.

2. A method as recited in claim 1, wherein the wafer further includes an etch-stop layer, wherein the pattern is transferred to the release layer by reactive ion etching.

3. A method as recited in claim 2, wherein the etch-stop layer is carbon based.

4. A method as recited in claim 1, wherein the pattern is transferred to the thin film layer by milling.

5. A method as recited in claim 1, wherein the release layer also functions as an antireflective coating.

6. A method as recited in claim 1, wherein the layer of photoresist is capable of resolving lines 60 nm in width or smaller.

7. A method as recited in claim 1, wherein the photoresist is resistant to $O_2$ reactive ion etching.

8. A method as recited in claim 1, wherein the photoresist contains silicon.

9. A method as recited in claim 1, wherein the layer of metal forms a biasing magnet.

10. A method as recited in claim 1, wherein the layer of metal forms a lead.

11. A method as recited in claim 1, wherein the pattern is transferred to the thin film layer by ion milling.

12. A method for fabricating a magnetic head, comprising:
   forming a wafer having a sensor film;
   adding a release layer to the wafer above the sensor, the release layer being soluble in a solvent;
   forming a layer of photoresist above the release layer;
   processing the layer of photoresist to define a pattern, the patterned layer of photoresist defining a track width of the sensor film under covered regions of the layers, the covered regions being under the patterned layer of photoresist;
   substantially removing uncovered regions of the release layer;
   substantially removing uncovered regions of the sensor film;
   adding a layer of metal to the wafer;
   baking the wafer at a predetermined temperature for a period of time sufficient to cause deformation of the photoresist to an extent that the photoresist creates cracks in the metal layer;
   applying a solvent to the wafer to dissolve at least a portion of the release layer, the solvent penetrating the cracks in the metal layer to reach the release layer; and
   removing portions of the layers above the release layer.

13. A method as recited in claim 12, further comprising adding an etch-stop layer above the sensor film, wherein the etch-stop layer is carbon based.

14. A method as recited in claim 12, wherein the release layer also functions as an antireflective coating.

15. A method as recited in claim 12, wherein the layer of photoresist is capable of resolving lines 60 nm in width or smaller.

16. A method as recited in claim 12, wherein the photoresist is resistant to $O_2$ reactive ion etching.

17. A method as recited in claim 12, wherein the photoresist contains silicon.

18. A method as recited in claim 12, wherein the layer of metal forms a biasing magnet.

19. A method as recited in claim 12, wherein the layer of metal forms a lead.

* * * * *